Figure 1:
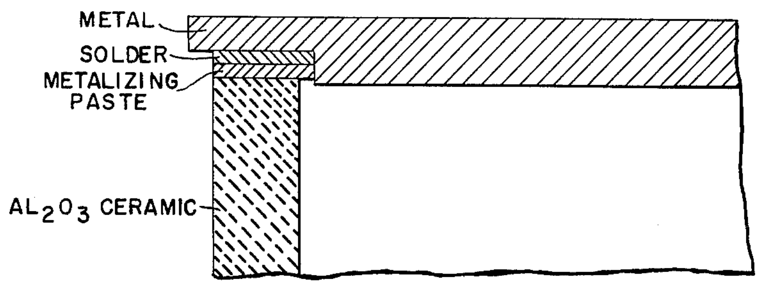

March 22, 1966 H. PULFRICH ETAL 3,241,995

METALLIZING SINTERED ALUMINA CERAMIC BODIES

Filed July 16, 1962

INVENTORS
Hans Pulfrich &
Hans Stopora
BY Spencer & Kaye
ATTORNEYS 3,241,995
Patented Mar. 22, 1966

3,241,995

METALLIZING SINTERED ALUMINA CERAMIC BODIES

Hans Pulfrich, Neu-Ulm (Danube), and Hans Stopora, Ulm (Danube), Germany, assignors to Telefunken Aktiengesellschaft, Berlin, Germany Filed July 16, 1962, Ser. No. 210,615
Claims priority, application Germany, July 19, 1958, T 15,406; Oct. 19, 1958, T 15,900
17 Claims. (Cl. 117—22)

This application is a continuation-in-part of co-pending application Serial No. 826,393, filed July 13, 1959, and now abandoned.

The present invention relates to metallized sintered alumina ceramic bodies having a predominantly high $Al_2O_3$ content, to the method of producing the same, and to metallic mixtures for use in their manufacture.

Superior bonds are desirable, for example, in the manufacture of high vacuum tube envelopes involving metallized ceramic materials of the type used in high frequency techniques. In order to provide the ceramic bulb section of these envelopes with metallic conductors or electrode connections, it is necessary to form a firmly adhering vacuum-tight bond between the ceramic body and the metal. Generally, this is accomplished by first metallizing the surface of the ceramic body to be contacted by the metal, thereby providing an intermediate transition layer without which the formation of a durable metal-to-ceramic seal cannot be obtained.

It has been known that firmly adhering metallic layers can be applied without difficulties, for example, on fosterite ceramics. In such ceramics, a small part of the ceramic mass will melt even at a temperature between 1250 and 1300° C. and will react with the metallizing layer which may consist, for example, of a brushed-on paste of tungsten or molybdenum powder with the usual additions of iron or manganese.

However, this does not apply in the case of $Al_2O_3$ ceramic bodies. The latter require separate additions to the sintered alumina mass of the reactants needed for the metallizing thereof. This is due to the fact that, in the past, there has been no effective way of firing a firmly adhering metallizing layer applied to a pure $Al_2O_3$ ceramic. These are the reasons that have rendered it undesirable to use pure sintered alumina in making envelopes suitable for metal-to-ceramic envelope structures.

Tests have shown that the outstanding mechanical strength properties of a pure $Al_2O_3$ ceramic may be greatly diminished as a result of these additions. They also show impairment of the dielectric losses, especially at high temperatures.

Numerous attempts have been made, as borne out by the literature on this subject, with a view to increase the reactivity of the metal mixtures applied to sintered alumina ceramics by the addition of sintered materials. Such additions comprise, for example, silica, kaolin, soapstone, and the like. These are essentially the same substances which are found in a ceramic having a lower $Al_2O_3$ content. The main characteristic of such sintered materials is that their melting point lies far below that of pure sintered alumina and, also, that the materials soften during the firing operation and form a strong bond with the metallized layer.

In the case of a sintered alumina ceramic having a degree of purity up to 95%, it is by this method possible to obtain, in addition, an increase in the adherence of tme metallizing layer. However, in the case of a high percent alumina ceramic having an $Al_2O_3$ content of 99% and more, the sintered bodies added for metallizing its surface no longer have the expected effect. This was found to be detrimental even to the ceramic body.

During the firing step in the method of metallizing the ceramic, the sintered material penetrates the grain boundaries of the pure sintered alumina and thus impairs the mechanical strength of the ceramic body by loosening its texture. This phenomenon is particularly noticeable upon the addition of powdered glass to the metal paste, which is made in accordance with numerous proposals in recent years.

The present invention is concerned with the production of firmly adhering metallic coatings on a sintered alumina ceramic of the purest type. The reactivity of the mixture to the ceramic body is not achieved by the addition of a material forming a melt during the firing operation, but rather a high-melting, exceedingly fine-grained ceramic powder having a large surface area.

Accordingly, it is an object of the present invention to provide an addition material for the metal mixture comprising a high-melting, fine-grained powder having a large reactive surface area.

In this connection, it is ordinarily preferred that the particle sizes of both the metal powder and the ceramic powder be less than 5$\mu$. However, it is most desirable to use particle sizes between 1 and 2$\mu$. The firing is then carried out at temperatures from 1550 to 1700° C. in a moist hydrogen-nitrogen atmosphere.

As a result of large scale tests, it was found most efficient to add to the metal mixture ceramic materials, such as $Al_2O_3$, $ZrO_2$, MgO, and preferably pure $Al_2O_3$ powder, of a particle size below 3$\mu$. The melting point of this powder must, under no condition, be lower than that of the ceramic body itself. Tests have shown that the large surface area of the added fine-grained powder, for example in the form of $Al_2O_3$, not only increases the sintering capacity of the mixture per se, but also produces a firm bond by the sintering of the mixture onto the underlying ceramic surface without any weakening of the ceramic in the soldering zone.

The applied layer may contain up to 50% of ceramic constituents. Good mechanical strength is obtained with 20 to 30% of $Al_2O_3$ powder having a particle size of 1 to 2$\mu$. The metallic component of the mixture conventionally is tungsten or molybdenum powder with additions of iron or manganese. Excellent results are also obtained with mixtures comprising only molybdenum and $Al_2O_3$ powder. In the case of metal powders, it is desirable to use particle sizes not above 5$\mu$.

The embodiments of the invention described hereinabove, require sintering at temperatures from 1550 to 1700° C. However, the technique of metalized ceramics has endeavored to prepare such metal-to-ceramic seals at temperatures as low as possible, since the necessary high temperature protective gas furnaces are very expensive. If the metalizing of ceramics can be successfully carried out at temperatures lower than about 1450° C., it will be possible to use furnaces which are considerably less complicated in their structure and which can be easier built in larger dimensions. In accordance with a modification of the present invention, it is possible to achieve this last-mentioned result when the metal powder and the ceramic powder have a particle size lying between 0.5 and 0.1$\mu$.

Tests have shown that, as a result of such further reduction of the particle size of the ceramic containing metal mixture, it is possible to obtain a superiorly adherent metal coating on a ceramic of high $Al_2O_3$ content even at temperatures lower than 1400° C. It has been found preferable, in this case, to apply a sintering time of one to three hours. Suitably, a metal mixture is used in which about 50% by volume of the ceramic constituent is present, which corresponds to about 25 to 30% by weight.

It is possible to use as the metal powder, for example, molybdenum powder, manganese powder or other ordinary metal powders. In order to improve the wetting of the solder, it is normally advisable to cover a layer applied in this manner with a second metalizing layer in which no ceramic is present, its composition corresponding to that of previously known layers. Both layers can be applied separately and sintered. However, it is also possible to apply the two layers one after the other and then sinter them in a single sintering operation. In this case, the metal mixture used to form the second metalizing layer should also have a particle size which is lying between 0.5 and 0.1μ. Generally, it is desirable that both the mixture for the bottom layer and the mixture for the second metalizing layer are applied in a thickness of about 15 to 20μ.

Typical examples of the components of mixtures which have proven particularly successful for metalizing a pure sintering alumina ceramic are as follows:

*Mixture 1*

| | |
|---|---|
| 55–65% Mo powder | Particle size smaller than 0.5μ. |
| 10–15% Mn powder | Particle size smaller than 0.5μ. |
| 25–30% $Al_2O_3$ powder | Particle size smaller than 0.5μ. |

Sintering temperature in a moist hydrogen-nitrogen atmosphere: 1300° C.

*Mixture 2*

| | |
|---|---|
| 85–90% Mo powder | Particle size smaller than 0.5μ. |
| 10–15% Mn powder | Particle size smaller than 0.5μ. |

Sintering temperature in moist hydrogen-nitrogen atmosphere: 1300° C.

A nickel layer is then applied on this metalized surface and fired at 900 to 1000° C. in dry hydrogen. The ceramic parts metalized in this way are ready for soldering to a metal surface in a conventional manner by means of silver-copper, gold-copper or other hard solders.

It is preferred to use as the ceramic component of the metal mixture the same ceramic as the one to be metalized. However, it is also possible to use $ZrO_2$ and MgO. This is not critical, but it will be appreciated that the melting point of this added ceramic powder should not be lower than that of the ceramic.

The method according to this invention is particularly adaptable for use in the manufacture of metal-ceramic envelopes of the type employed in high frequency techniques.

The mixture according to the present invention may be in powder form and be sprinkled, sprayed or otherwise spread upon the surface of the ceramic, and, after being so applied, be sintered.

If desired, the mixture may be incorporated in a paste which is then applied onto the surface of the ceramic. The pastiness is obtained by mixing the powder mixture with an appropriate binder, as, for example, a nitro cellulose binder such as the 10% binder (10% nitro celluose (binder) and 90% ethyl acetate (vehicle)) mentioned in U.S. Patent No. 2,814,571. The ratio of powder mixture to this 10% binder may, for example, be 40 grams of powder to 100 grams of binder.

Figure 2:
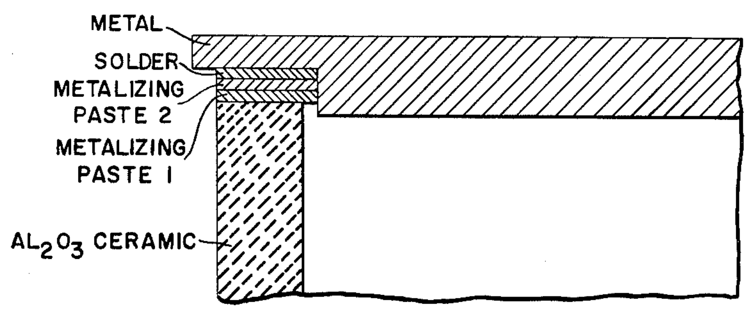

In the accompanying drawing, FIGURES 1 and 2 are sectional views showing two embodiments of seals made in accordance with the present invention, with FIGURE 1 illustrating a single-layer seal constituted by a single metallizing paste and FIGURE 2 illustrating a double-layer seal constituted by two metallizing pastes 1 and 2.

We claim:

1. A method for the manufacture of a well adhering coating on a substantially pure sintered alumina ceramic body, comprising the step of sintering a layer of a mixture containing a highly melting metal powder and an added ceramic powder onto said body, said added ceramic powder consisting of alumina ceramic powder having a particle size smaller than 5μ.

2. A method according to claim 1, wherein the particle size of said metal powder and of said added ceramic powder is smaller than 1μ.

3. A method according to claim 1, wherein the particle size of said metal powder and of said added ceramic powder is between 0.5 and 0.1μ.

4. A method according to claim 3, wherein the first-mentioned metalizing layer is covered by a second metallic layer without added ceramic component, and wherein the particle size of said second layer is between 0.5 and 0.1μ.

5. A method according to claim 4, wherein the two layers are applied on the ceramic one after the other and are sintered onto the ceramic body by a single sintering operation at temperatures below 1400° C.

6. A method according to claim 4, wherein the two layers are applied in thicknesses each of about 15 to 20μ.

7. A method according to claim 4, wherein the metallic bottom layer contains about 15 to 40% by weight of the ceramic component.

8. A method according to claim 4, wherein the bottom layer applied to the ceramic body has the following composition by weight:

55–65% Mo powder having a particle size of about 0.5μ;
10–15% Mn powder having a particle size of about 0.5μ;
25–30% $Al_2O_3$ powder having a particle size of about 0.5μ;

and wherein the metallic layer applied to such a bottom layer has the following composition by weight:

85–90% Mo powder having a particle size of about 0.5μ;
10–15% Mn powder having a particle size of about 0.5μ.

9. A method according to claim 1 wherein said mixture is incorporated in a paste.

10. A method for the manufacture of a well adhering metallic coating on a substantially pure sintered alumina ceramic body, comprising the steps of:

(a) applying onto the ceramic body a first layer containing 55–65% (by weight) Mo powder having a particle size of about 0.5μ, 10–15% (by weight) Mn powder having a particle size of about 0.5μ, and 25–30% (by weight) fine grained $Al_2O_3$ powder having a particle size of about 0.5μ, said last-mentioned powder having a large reactive surface area and a melting point which is equal to at least that of the ceramic body;
(b) thereafter covering said first layer with a second metallic layer, free of ceramic powder, and containing 85–90% (by weight) Mo powder having a particle size of about 0.5μ and 10–15% (by weight) Mn powder having a particle size of about 0.5μ; and
(c) sintering said two layers onto the ceramic body by a single sintering operation, in moist $H_2+N_2$, at a temperature of between about 1300° C. and 1700° C.

11. In an aluminum-ceramic envelope having a metalized surface at the seam between the metal and ceramic parts thereof, the improvement comprising a seal containing a highly melting metal powder and an addition of fine grained alumina ceramic powder having a particle size smaller than 5μ and a melting point which is not lower than that of the ceramic part.

12. The improvement defined in claim 11 wherein said seal is a paste.

13. A mixture for use in coating substantially pure, sintered, alumina ceramic bodies to form metallized surfaces thereon comprising a highly melting metal powder and an added material capable of being sintered on said ceramic bodies, said added material including a fine-grained alumina ceramic powder having a particle size smaller than 5μ and a melting point which is not lower than that of said ceramic bodies.

14. A mixture as defined in claim 13 and being in pasty form.

15. Method for the preparation of a metallized sinter alumina ceramic body which comprises applying to the surface of an alumina ceramic body containing at least 99% $Al_2O_3$, a high melting, fine-grained ceramic material having a large reactive surface area, said material being composed of at least one metal powder having a particle size smaller than 5μ and selected from the group consisting of W, Mo and Mn to the extent of about 70% to 75% by weight and a metal oxide powder having a particle size smaller than 5μ and consisting substantially exclusively of $Al_2O_3$ to the extent of about 25% to 30% by weight and sintering at a temperature of between about 1300° C. and 1700° C., to cause the material to form a firmly adherent coating on the ceramic body.

16. The method of claim 15 in which the finely divided metal oxide is alumina of at least 99% $Al_2O_3$ content.

17. The method of claim 15 in which the metal oxide has a particle size of between about 0.1 and 0.5 micron.

References Cited by the Examiner

UNITED STATES PATENTS

| | | | |
|---|---|---|---|
| 2,775,531 | 12/1956 | Montgomery et al. | 117—22 |
| 2,928,755 | 3/1960 | Brandstadt | 117—22 |
| 3,031,316 | 4/1962 | Cavanaugh | 106—1 |

JOSEPH B. SPENCER, *Primary Examiner.*

RICHARD D. NEVIUS, *Examiner.*